United States Patent [19]
Kacek

[11] 3,800,534
[45] Apr. 2, 1974

[54] AUXILIARY HYDRAULIC POWER SUPPLY

[75] Inventor: Donald J. Kacek, Rockford, Ill.

[73] Assignee: Sundstrand Corporation, Rockford, Ill.

[22] Filed: Mar. 27, 1972

[21] Appl. No.: 238,352

[52] U.S. Cl............ 60/39.28 R, 60/39.14, 60/39.46, 60/223, 60/250, 60/251
[51] Int. Cl............................. F02c 9/08, F02c 9/10
[58] Field of Search................ 60/39.28, 223, 39.14; 415/10

[56] References Cited
UNITED STATES PATENTS

| | | | |
|---|---|---|---|
| 3,038,306 | 6/1962 | Loft | 60/39.14 |
| 3,660,977 | 5/1972 | Reynolds | 60/39.28 R |
| 3,614,457 | 10/1971 | Eggenberger | 415/10 |
| 3,578,871 | 5/1971 | Sakamoto | 415/10 |

*Primary Examiner*—Clarence R. Gordon
*Attorney, Agent, or Firm*—Hofgren, Wegner, Allen, Stellman & McCord

[57] ABSTRACT

An emergency hydraulic power supply for an aircraft or the like, including a hydraulic pump arranged to be driven by a turbine in turn driven by hot gas from a decomposition chamber, a fuel pump driven by the turbine for supplying fuel to the decomposition chamber, primary flow control valve means in the pump outlet for controlling fuel flow responsive to turbine speed, an ignition chamber communicable with the decomposition chamber and having a start grain for initiating turbine operation to start the fuel pump, a secondary control valve in the pump outlet, and control means for sensing turbine speed and opening the secondary valve when the turbine attains a speed indicating the start grain has about burned out, and closing the secondary valve in the event that the turbine attains a speed indicating the primary flow control valve means is inoperative to control turbine speed.

9 Claims, 2 Drawing Figures

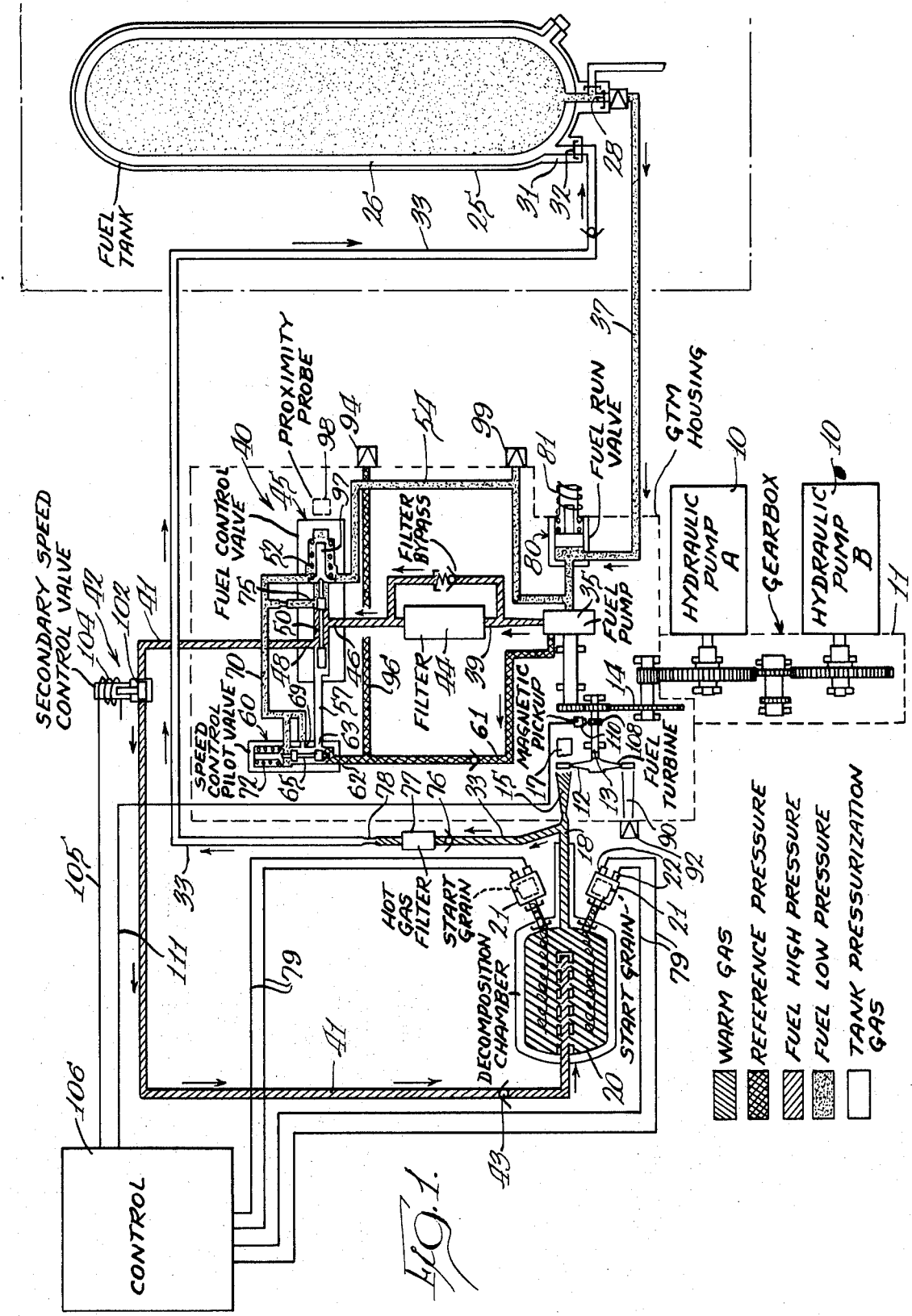

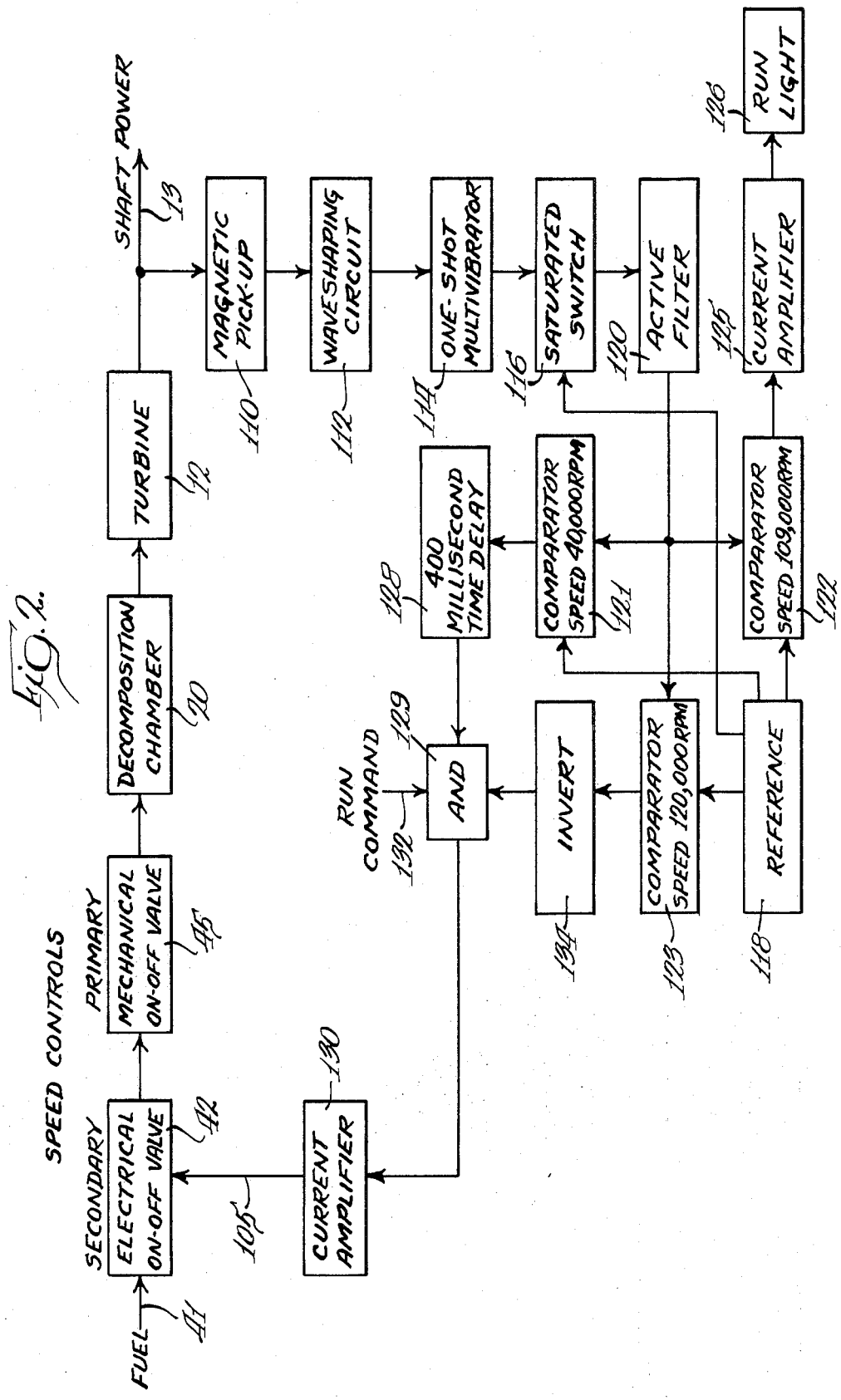

AUXILIARY HYDRAULIC POWER SUPPLY

BACKGROUND OF THE PRESENT INVENTION

In modern aircraft, it is conventional practice to provide a hydraulic power supply which includes a pump for delivering fluid under pressure to operate various auxiliary systems such as leading edge slats and trailing edge flaps. It has been customary to drive the hydraulic pump by power derived in some way from the main aircraft engines. Reliable operation of the pump is obtained in such arrangements as long as the main engines operate satisfactorily. In event of failure of the main engines, it is desirable to provide for emergency hydraulic power to operate the airfoil surfaces sufficiently to safely manipulate the aircraft to a controlled landing, in preference to loss of all steering capability. The present invention relates to an auxiliary system for driving a hydraulic pump for a limited period of time to provide fluid under pressure for an emergency landing.

In the prior application of Reynolds, Ser. No. 16,841, filed Mar. 5, 1970, now U.S. Pat. No. 3,660,977, assigned to the assignee of this application, an emergency hydraulic power system includes a turbine wheel adapted to be driven by hot gas and arranged to drive a hydraulic pump, a chamber for decomposition of fuel to produce hot gas to drive the turbine wheel, a fuel pump driven by the turbine wheel for supplying fuel to the decomposition chamber, a fuel outlet conduit connecting the pump outlet and the decomposition chamber, flow control valve means in the output conduit responsive to turbine speed for regulating fuel flow to the decomposition chamber to maintain constant turbine speed, and an ignition chamber communicable with the decomposition chamber for holding a solid fuel grain for initiating turbine operation to start the fuel pump.

In the prior system, the flow control valve means includes a primary flow control valve member in the fuel outlet conduit between the pump and the decomposition chamber, together with means normally biasing such valve member to an open position communicating the fuel pump and decomposition chamber, and a pilot valve controlling the main valve responsive to pressure in the outlet conduit in a manner to decrease fuel flow from the pump to the decomposition chamber in response to pressure increase in the outlet conduit, and increase fuel flow from the pump to the decomposition chamber in response to decrease in pressure in the pump outlet conduit. On initiating operation of the system, the start grain in the ignition chamber is ignited to produce hot gas which brings the turbine up to speed sufficient to start operation of the fuel pump so that the system becomes self-sustaining. The size of the start grain is preferably chosen in a manner to assure that the turbine is brought up to appropriate speed under varying environmental temperatures, and such function is best obtained if the major portion of the start grain burns alone before introduction of liquid fuel, whereas the main flow control valve would normally be in open position on initiating operation of the system, so that the fuel pump may immediately start delivery of liquid fuel to the decomposition chamber. With such an arrangement, there is the possibility of the turbine overspeeding and destroying itself.

More particularly, on starting the system in operation in a relatively hot environmental temperature, the moving parts are relatively free and the system can be brought up to speed in a relatively short period of time, and the fuel pump could start delivery in a very short time. On the other hand, when the system is put into operation in relatively cold environmental temperatures, the moving parts are likely to resist starting, and it may be longer before the fuel pump initiates delivery of fuel to the decomposition chamber. Because of the requirement for a longer burning grain under relatively cold starting conditions, it is possible that more rapid burning and more rapid fuel delivery on a relatively hot day could result in turbine overspeed. Accordingly, there is a need for a secondary speed control.

SUMMARY OF THE INVENTION

It is an object of the present invention to provide a secondary control valve in the fuel line leading to the decomposition chamber, together with control means for sensing turbine speed and opening the secondary valve when the turbine attains a speed indicating that the start grain has about burned out.

Preferably, the secondary speed control valve is located in the line between the fuel pump outlet and the decomposition chamber, so that on initiating operation of the system, the fuel pump works against the closed valve and exerts a retarding effect on the turbine to aid in preventing an overspeeding condition which might result in damage to the turbine.

The secondary speed control valve includes a valve member which is normally biased toward a position blocking communication between the fuel pump and the decomposition chamber, and electrically operated means for moving the valve member to a position for communicating the fuel pump and the decomposition chamber.

Preferably, the control means for sensing turbine speed also functions to close the secondary speed control valve in the event that the turbine attains a predetermined overspeed indicating the main flow control valve means is inoperative.

In the preferred system illustrated, the control means for sensing turbine speed includes a magnetic pickup device for producing a series of electric pulses having a frequency proportional to turbine speed for comparison to a reference frequency to control the secondary valve.

BRIEF DESCRIPTION OF THE DRAWINGS

FIG. 1 is a diagrammatic illustration of an auxiliary hydraulic power supply system embodying the principles of the present invention; and FIG. 2 is a block diagram illustrating the speed sensing means and its relationship to the secondary speed control valve.

DETAILED DESCRIPTION OF PREFERRED EMBODIMENT

Referring now to the drawings in more detail, hydraulic pumps 10 are mounted on a gear box 11 and adapted to be driven by appropriate gearing for producing desired pump speed. During normal operation of the aircraft, when the main propulsion engines are functioning properly, power may be derived in one form or another from the main engines for input to the gear box to drive the hydraulic pumps. For example, bleed air may be derived from a supply associated with one or more jet engines to drive an air turbine wheel providing an input to the gear box 11. In the event of engine failure, when emergency power is required to safely land the aircraft, use is made of a hot gas turbine wheel 12 on a shaft 13 connected by appropriate gearing 14 to drive the pumps 10.

The turbine wheel 12 is formed at the periphery with suitable axial flow inpulse blades, and a hot gas nozzle 15 is arranged to direct hot gas to the blades to rotate the wheel. Spent gas is directed overboard to atmosphere through an exhaust illustrated in part at 17. Hot gas is supplied to the nozzle 15 through a conduit 18 leading from a chamber 20 formed for combustion or decomposition of appropriate liquid fuel.

In order to initiate operation of the system prior to delivery of liquid fuel to the decomposition chamber 20, there are starting devices as at 21 associated with the decomposition chamber. Each starting device 21 comprises an ignition chamber communicable with the decomposition chamber and adapted to contain a solid fuel grain which may be ignited by ignition means 22 adapted to be electrically energized. If the maximum period of operation of the auxiliary system is rather short, on the order of 5 minutes, only one starting device may be sufficient. On the other hand, if the system has a capability for longer periods of operation on the order of 20 minutes, it is desirable to utilize more than one starting device, because it is conceivable that the main engines might fail under circumstances requiring initiation of system operation, then restart, permitting shutdown of the auxiliary system, and fail again and require ignition of the auxiliary system again.

Fuel is stored in a tank comprising an outer protective enclosure 25 and an inner liner or receptacle 26 containing the fuel supply. Under normal standby conditions, the filled liner 26 is closed by a hermetically sealed burst disc as at 28 adapted to be ruptured on application of suitable pressure to the fuel, for example, on the order of 200 psi. In order to pressurize the outer enclosure 25 and collapse the inner liner 26 to force fuel from the tank toward the decomposition chamber, the outer enclosure 25 includes a fitting 31 with a hermetically sealed burst disc 32 adapted to be ruptured by the application of pressurization fluid through a conduit 33.

In order to deliver fuel from the storage tank 26 to the decomposition chamber 20, use is made of a centrifugal pump 35 driven by the turbine wheel 12. Fuel is supplied from the tank to the pump inlet through an inlet conduit 37. Fuel is supplied from the pump to the decomposition chamber 20 through an outlet conduit 39, a main flow control valve means 40, and a conduit 41 leading from the flow control valve means to the chamber 20 through a secondary speed control valve 42 and a check valve 43. Preferably, the pump outlet conduit 39 includes a filter 44 and an appropriate by-pass around the filter to permit flow in event of clogging.

The flow control valve means 40 is the subject of the previously mentioned application of Reynolds Ser. No. 16,841, filed Mar. 5, 1970. Such valve means includes a main control valve 45 having an inlet port 46 communicating with the outlet conduit 39, and an outlet port 48 communicating with the conduit 41 which leads to the decomposition chamber 20. The inlet port 46 and the outlet port 48 intersect a valve bore housing a valve member having enlarged opposite end portions and an intermediate reduced portion 50 adapted to communicate the ports 46 and 48 when the valve member is positioned as illustrated in FIG. 1. The valve member is biased toward the position illustrated by a spring 52 acting against the end of the valve member in a chamber communicating with a conduit 54 leading to the pump inlet conduit 47. The valve member is adapted to be moved toward the right as viewed in FIG. 1, against the bias of the spring 52, to a position where the land at the left end of the valve member blocks communication of the valve bore with the outlet port 48 when fluid pressure is applied to the left end of the valve member through a conduit 57 controlled by a pilot valve 60.

The pilot valve 60 senses the pressure of fluid in the fuel pump outlet, and when the pressure rises sufficiently in the outlet, a pressure signal is transmitted through the passage 57 to close the valve 45. Valve 60 communicates with the pump outlet through a conduit 61, and includes a valve bore having an inlet port 62 communicating with conduit 61 and an outlet port 63 communicating with conduit 57. In the valve bore, a valve member includes enlarged opposite ends and an intermediate reduced portion 65 normally positioned to communicate the port 63 with a drain port 69 leading through a conduit 70 to the conduit 54. The pilot valve member is biased toward the illustrated position by a spring 72 acting against the upper end of the valve member in a chamber communicating with the conduit 70.

In operation, the main valve 45 is either open or closed, and is normally maintained in the open position illustrated by spring 52 when the pressure of fluid in the pump outlet does not exceed the spring setting of the pilot valve 60. When the pressure in the conduit 61 rises above a predetermined value, the pilot valve member is moved upwardly from the position illustrated to a position where the inlet port 62 communicates with the outlet port 63, supplying fluid under pressure through the conduit 57 to the left end of the main valve member to move the latter to a closed position where inlet port 46 communicates with a drain port 75 leading to the passage 70. The resulting reduction in flow to the decomposition chamber and to the turbine have the effect of reducing the speed of the fuel pump and thereby reducing the pressure of fluid in the pump outlet conduit 39. When the pilot valve member moves downwardly again, pressure is relieved from the left end of the main valve member and the latter returns toward the open position illustrated. In this way, the speed of the turbine is controlled to be substantially constant as described in detail in the aforementioned application of Reynolds.

In order to pressurize the fuel in the storage tank, hot gas is bled from the hot gas conduit 18 through the conduit 33. Preferably, the pressurization conduit 33 leads from the hot gas conduit 18 at a place where pressure may be obtained adequate for appropriate pressurization in the fuel storage tank on the order of 200 psi. As illustrated, the pressurization conduit 33 includes a check valve 76, a filter 77, and a restricted pressure reducing orifice 78.

In order to put the system into operation from a standby status, an igniter 22 is electrically energized through circuit means 79 which initiates combustion of the solid fuel grain in the ignition chamber 21. The hot gas products of combustion pass into the decomposition chamber 20 and then to the hot gas nozzle 15 to start operation of the turbine wheel 12. Rotation of the turbine wheel has the effect of starting operation of the pump 35 to supply fuel from the storage tank to the decomposition chamber at approximately the time when the fuel in the ignition chamber 21 is exhausted, so that the system will then be self-sustaining. In order to control flow of fuel from the storage tank to the fuel pump, the inlet conduit 37 preferably includes an on-off valve 80 normally spring-biased to a closed position blocking communication between the fuel tank and the fuel pump. The valve is movable to an open position by solenoid means 81 adapted to be remotely energized by circuitry (not illustrated) at the same time that the igniter 22 is energized.

The nature of the system as an auxiliary apparatus may result in its existence for extended periods of time in standby condition without operation under impetus involving decomposition of fuel in the chamber 20. However, because of the critical importance of the system, it is desirable that it be capable of testing from time to time to assure that it remains in a state of reliable readiness for operation in event of emergency. Accordingly, provision is made for testing various components of the system by application of external pressure for operating the turbine wheel and the parts rotated thereby as well as the control valve means 40.

More particularly, a cold gas nozzle 90 is associated with the turbine wheel 12 in a manner to direct cold gas against the turbine blading for operation sufficient to determine that the rotatable parts are free in event they are needed. The cold gas nozzle communicates with a quick disconnect coupling 92 of conventional construction which facilitates application of an external source of pressure such as a tank of compressed nitrogen. Additionally, valve means 40 may be checked by application of compressed nitrogen to a quick disconnect coupling 94 on a conduit 96 communicating with the pilot valve 60. In order to verify operation of the main control valve 40 during testing, the movable valve member engages a spring guide 97 adapted to actuate an indicator 98 illustrated diagrammatically in broken lines. In order to prevent any pressure buildup in the inlet conduit 37 during testing, a quick disconnect coupling 99 is provided in communication with the pump inlet conduit 37 to connect the latter to atmosphere during testing.

In a preferred system, the fuel tank is pressurized at about 200 psi. As a result, the pressure at the inlet to the fuel pump is on the order of 200 psi, while the pump develops pressure on the order of 1,000 psi at the pump outlet. In order to test the system for operability, gas may be applied to the couplings 92 and 94 at about 1,000 psi.

For purposes of initiating operation of the system under actual emergency conditions when it is called upon to deliver auxiliary power, the size of the solid fuel start grain in ignition chamber 21 is calculated to bring the turbine up to approximately 40 percent of its rated speed, even under adverse conditions, so that the fuel pump is operating in a manner to supply liquid fuel to the decomposition chamber for ignition by the time the start grain is exhausted. When starting the system in a very cold environment, the lubricating fluid and the hydraulic fluid associated with rotatable parts may offer resistance to movement, and the inertia of the system is relatively great in comparison to starting conditions in a relatively hot environment where the fluids are thinner and offer less resistance. Additionally, if the system is being started for the first time and the lines are substantially evacuated, a longer time will be required to deliver fuel from the storage tank to the decomposition chamber than when the system is being restarted and the lines are substantially filled with liquid fuel. Over a wide range of varying starting conditions, it is preferable that the starting operation be supported only by the start grain, rather than adding additional variables which arise when liquid fuel is also supplied during the starting phase. Since the main flow control valve 45 is normally in an open position, it is possible under some starting conditions for the fuel pump to supply fuel before the start grain is substantially exhausted. If prematurely delivered to the decomposition chamber, the liquid fuel might produce undesirable overspeeding of the turbine during the starting phase. In order to control the flow of liquid fuel to the decomposition chamber during the starting phase, the secondary speed control valve 42 is operated in a manner to prevent delivery of liquid fuel to the decomposition chamber until the turbine has attained a predetermined minimum speed.

More particularly, the secondary speed control valve 42 includes a valve member 102 normally biased to a closed position blocking communication between the valve 45 and the decomposition chamber 20. In order to move the valve member 102 to an open position permitting communication between the valve 45 and the decomposition chamber 20, the valve member is controlled by a solenoid 104 connected by wiring 105 to a control system 106 which is responsive to the speed of the turbine wheel 12.

In order to sense the speed of the turbine wheel 12, the turbine shaft 13 carries a gear-like member 108 having a plurality of teeth rotatable past a magnetic pickup device 110 connected by wiring 111 to the control system 106. The magnetic pickup device 110 is utilized in a speed measuring system of a type which is generally well known in the art. Typically, a magnetic pickup includes a coil and a magnet which are mounted adjacent a rotating part having an interrupted magnetic material, such as gear 108 with angularly spaced teeth. As the teeth of the gear pass the coil, the magnetic flux linking the coil to the gear is modified, thereby producing pulses. The output of the magnetic pickup is a train of pulses, the frequency of which is proportional to the turbine speed. In the absence of correction, the pulse shape and duration vary considerably with the speed of the shaft. In the control system as illustrated in FIG. 2, the train of pulses is changed to a square wave form by a wave shaping circuit 112. The shaped pulses are then applied to a one-shot multivibrator 114 having an output pulse of fixed width for each input pulse applied. The pulse width is selected at a convenient value in relationship to the highest operating speed. The train of fixed width pulses from the multivibrator 114 is then applied to a saturated switch 116 where amplitude of the pulse is also fixed at a value nearly equal to a reference voltage supplied from a reference source 118. The train of pulses of fixed amplitude and width is then filtered by an active low pass filter 120 to a DC voltage level.

The output of the filter 120 is a DC voltage which is directly proportional to turbine speed. Such DC voltage is supplied to three comparators, 121, 122 and 123. Each comparator has a different reference voltage so that various speed levels may be detected, and the output of each comparator is in an "off" state until the reference level is reached. When the reference level is reached, the output switches to the "on" state. In the system as illustrated herein, the comparator 121 is set to detect a speed of 40,000 rpm, the comparator 122 is set to detect a speed of 109,000 rpm, and the comparator 123 is set to detect a speed of 120,000 rpm.

The speed of 109,000 rpm which is detected in the comparator 122 is in the normal operating range of the turbine wheel 12, and the output of the comparator is supplied through a current amplifier 125 to energize a "run" light 126 for indicating that the unit is operating in the normal range.

The comparator 121 set for detecting a speed of 40,000 rpm is utilized for controlling the secondary speed control valve 42. The output from the comparator 121 may be delayed for a short time in a time delay device 128 and is then delivered through an AND gate 129 to a current amplifier 130 for purposes of energizing the solenoid 104 in the secondary speed control valve 42. The time delay device 128 may be utilized to take into account various factors such as temperature, start grain characteristics, and the time required for the unit to reach self-sustaining speed. The AND gate 129 depends upon an output signal from the time delay device 128 and also depends upon a "run" command 132 from the aircraft crew. The AND gate also receives a signal from an inverter 134 responsive to the comparator 123.

In operation, if the comparator 121 supplies a signal indicating that the turbine wheel has attained a speed of 40,000 rpm, and a "run" command is available at 132, and the comparator 123 indicates that the speed has not exceeded 120,000 rpm, a signal is supplied through the current amplifier 130 to the solenoid 104 for purposes of moving the valve member 102 from the normally closed position to an open position permitting communication between the main fuel control valve 45 and the decomposition chamber 20. At this time, it would be expected that the start grain in the ignition chamber 21 is about to be exhausted and that the liquid fuel should be supplied to the decomposition chamber in time for ignition by the starting fuel, in order that the system will thereafter be self-sustaining, when the liquid fuel provides power for driving the turbine, and the turbine drives the fuel pump to continue the fuel supply.

The secondary speed control valve is also utilized to exercise an overspeed control on the system. In the event that the primary fuel control valve means 40 fails in a way such that the main valve 45 remains in the normally open position and is not subject to control by the pilot valve 60, the constantly open valve 45 would ultimately lead to an overspeed condition which could result in destruction of the turbine wheel 12 due to disintegration. According to the present invention, the overspeed condition is sensed by the comparator 123 when the turbine attains approximately 110 percent of rated speed, for purposes of closing the secondary speed control valve 42. More particularly, when the comparator 123 senses a turbine speed of 120,000 rpm, the AND gate 129 is deprived of a necessary input, and the output from the gate is discontinued, thereby to deenergize the solenoid 104 in the valve 42. On deenergization of the solenoid, the valve closes and the fuel supply to the decomposition chamber is temporarily discontinued. When the speed of the turbine wheel again decreases to a value less than 120,000 rpm, the signal from the comparator 123 is again supplied to the AND gate for purposes of reopening the secondary speed control valve. In this manner, the valve 42 is utilized to impose a secondary control at a level of approximately 110 percent of the desired speed.

I claim:
1. An auxiliary power supply system, comprising,
   a. a turbine wheel adapted to be driven by hot gas to provide mechanical power,
   b. a chamber for decomposition of fuel to produce hot gas,
   c. a hot gas conduit connecting the decomposition chamber and the turbine wheel to supply hot gas to drive the wheel,
   d. a fuel pump driven by the turbine wheel for supplying fuel to the decomposition chamber,
   e. a fuel outlet conduit connecting the pump outlet and the decomposition chamber,
   f. a fuel tank for storing fuel to be supplied to the decomposition chamber,
   g. a fuel inlet conduit connecting the fuel tank and the pump inlet,
   h. a start chamber communicable with the decomposition chamber for containing starting fuel for initiating turbine operation to start the fuel pump,
   i. flow control valve means in the outlet conduit responsive to turbine speed for regulating fuel flow from the pump to the decomposition chamber to control turbine speed,
   j. a secondary control valve in one of said conduits for blocking fuel flow between the tank and the decomposition chamber,
   k. control means responsive to the speed of the turbine for opening the secondary control valve when the turbine attains a predetermined minimum speed.

2. An auxiliary power supply system as defined in claim 1, wherein
   the flow control valve means comprises a valve member responsive to pressure increase in the fuel pump outlet for reducing fuel flow to the decomposition chamber and responsive to pressure decrease in the pump outlet for increasing fuel flow to the decomposition chamber, thereby to maintain constant turbine speed.

3. An auxiliary power supply system as defined in claim 2, including
   control means responsive to the speed of the turbine for closing the secondary control valve in event the turbine speed exceeds a predetermined maximum permissible value.

4. An auxiliary power supply system as defined in claim 1, wherein
   the secondary control valve is located in the outlet conduit between the pump and the decomposition chamber.

5. An auxiliary power supply system as defined in claim 1, wherein the control means comprises electrical means for sensing the speed of the turbine and a solenoid responsive to the sensing means for operating the secondary control valve.

6. An emergency hydraulic power supply system for an aircraft, comprising,
  a. a turbine wheel adapted to be driven by hot gas,
  b. a hydraulic pump driven by the turbine wheel to supply hydraulic fluid to an aircraft hydraulic system,
  c. a chamber for decomposition of fuel to produce hot gas,
  d. a hot gas conduit for supplying hot gas from the decomposition chamber to the turbine wheel,
  e. an exhaust for conducting spent gas from the turbine wheel to atmosphere,
  f. a fuel pump driven by the turbine wheel for supplying fuel to the decomposition chamber,
  g. a fuel outlet conduit connecting the pump outlet and the decomposition chamber,
  h. a fuel tank for storing fuel to be supplied to the decomposition chamber,
  i. a fuel inlet conduit connecting the fuel tank and the pump inlet,
  j. means for pressurizing the fuel tank,
  k. an ignition chamber communicable with the decomposition chamber for holding a start grain for initiating turbine operation to start the fuel pump,
  l. flow control valve means in the outlet conduit responsive to turbine speed for regulating fuel flow to the decomposition chamber to maintain constant turbine speed,
  m. a secondary control valve in said outlet conduit normally blocking communication between the fuel pump and the decomposition chamber, and
  n. control means responsive to the speed of the turbine for opening the secondary control valve when the turbine attains a predetermined minimum speed.

7. An emergency hydraulic power supply system for an aircraft as defined in claim 6, wherein
  means for pressurizing the fuel tank comprises a conduit leading from the hot gas conduit for supplying hot gas under pressure to the fuel tank.

8. An emergency hydraulic power supply system for an aircraft as defined in claim 6,
  including control means responsive to the speed of the turbine for closing the secondary valve in event the turbine speed exceeds a predetermined maximum value.

9. An emergency hydraulic power supply system for an aircraft as defined in claim 8, wherein
  the secondary control valve comprises a valve member normally biased toward a position blocking communication between the fuel pump and the decomposition chamber, and a solenoid for moving the valve member to valve open position,
  and the control means comprises electrical means for sensing turbine speed and energizing the solenoid when the turbine attains a speed indicating the start grain has about burned out and deenergizing the solenoid when the turbine attains a speed indicating the flow control valve means is inoperative.

* * * * *